United States Patent [19]

Uno

[11] 3,761,639

[45] Sept. 25, 1973

[54] TELEPHONE DIALS

[75] Inventor: Ken Uno, Sagamihara, Japan

[73] Assignee: Tamura Electric Works, Ltd., Tokyo, Japan

[22] Filed: Dec. 29, 1971

[21] Appl. No.: 213,322

[30] Foreign Application Priority Data

Dec. 31, 1970 Japan............................ 45/123292

[52] U.S. Cl................................................ 179/90 D
[51] Int. Cl............................................. H04m 1/36
[58] Field of Search..................................... 179/90

[56] References Cited

UNITED STATES PATENTS 3,284,578 11/1966 Evans.................................. 179/90

*Primary Examiner*—Kathleen H. Claffy
*Assistant Examiner*—Ken Richardson
*Attorney*—C. Yardley Chittick et al.

[57] ABSTRACT

In a telephone dial wherein dial impulses corresponding to the digits dialed are transmitted by a dial pulse generating means, there are provided a rotary disc having a plurality of projections of the number and positions corresponding to predetermined first digits of the called numbers, the call thereof being precluded, and means to rotate the disc in response to the dialing of these unwanted first digits to bring the projection to a position to disenable dial impulse generating means.

2 Claims, 5 Drawing Figures

INVENTOR

KEN UNO

BY Charles E. Pfund

ATTORNEY

INVENTOR
KEN UNO

BY Charles E. [signature]
ATTORNEY

TELEPHONE DIALS

BACKGROUND OF THE INVENTION

This invention relates to a telephone dial and more particularly to a telephone dial including means for preventing transmission of the dial impulse which is generated when the first digit of the telephone number of an unwanted called party is dialed.

In a telephone system wherein a talking line is immediately established by dialing, if a user makes a trunk call over a long distance without the permission of the subscriber, the subscriber is incured to pay the telephone fee for such an unauthorized call. In a telephone dial designed for preventing the transmission of the dial impulse for the first digit of a trunk exchange, an additional contact has been provided for short circuiting the impulses for the trunk exchange. Since such telephone dial is constructed to prevent transmission of the dial impulse corresponding to a particular first digit for example 0, it can not be used in districts wherein trunk calls are possible with a first digit other than 0.

SUMMARY OF THE INVENTION

It is therefore an object of this invention to provide an improved telephone dial which can prevent transmission of the dial impulses corresponding the first digits of the call numbers, the call thereof should be precluded. Such first digits may be of any one or more than one of digits of 0 to 9 inclusive.

According to this invention, there is provided a telephone dial comprising a dial mounted on a rotatable shaft, an intermediate gear mounted on the shaft to be rotable only in a given direction, a pin mounted on the intermediate gear, means to bias the intermediate gear to rotate in the given direction, a pawl associated with the shaft and arranged such that the pawl can engage the pin only when the dial is in the inoperative position so as to drive the intermediate gear against the bias means, a rotary disc associated with the intermediate gear, impulse transmitting means, and an operating member driven by the said shaft for operating the impulse transmitting means, the rotary disc having a predetermined number of projections adapted to selectively prevent the return motion of said operating members, means responsive to the hook-off of the associated hand-set to prevent the return motion of the rotary disc, said projections corresponding to predetermined first digits of the called numbers, the call thereof being precluded, whereby when the predetermined first digits are dialed, the impulse transmitting means is rendered inoperative.

BRIEF DESCRIPTION OF THE DRAWINGS

The invention can be more fully understood from the following detailed description taken in conjunction with the accompanying drawing in which.

DESCRIPTION OF THE PREFERRED EMBODIMENT

Figure 1:
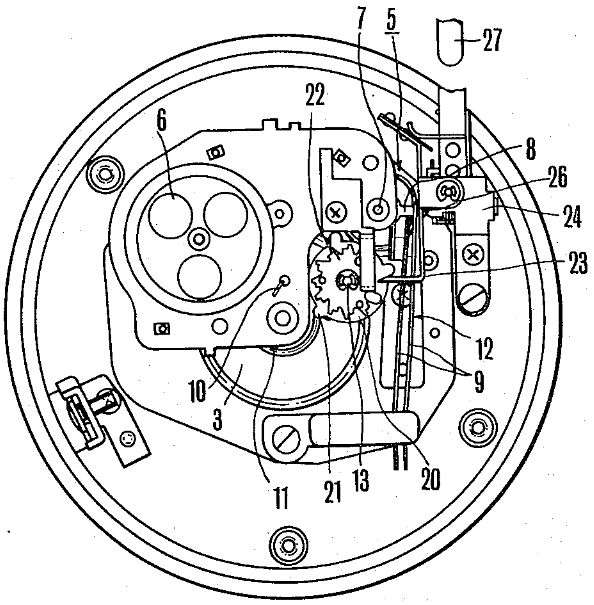
FIG. 1 shows a rear view of a telephone dial embodying the invention.

As will be described later, the embodiment shown in the drawing is designed to prevent the transmission of the dial impulses of the first digits which are selected to be digits 1, 5 and 0. Accordingly, when any one of 2, 3, 4, 6, 7, 8 and 9 is dialed at first by the user, the impulse transmitting mechanism is unlocked to operate freely.

Figure 2:
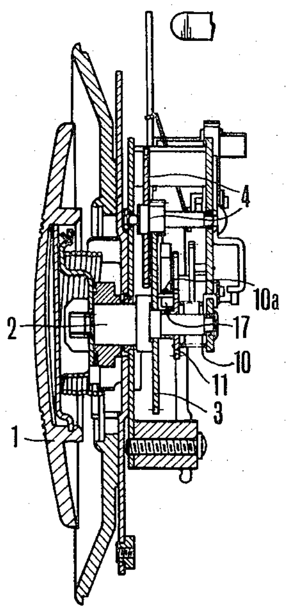
FIG. 2 is a transverse sectional view of the dial shown in FIG. 1.

A preferred embodiment of this invention illustrated in FIGS. 1 and 2 comprises a gear 3 secured to main shaft 2 of the dial 1 and an impulse transmitting mechanism 5 including a shaft 7 which is driven by main gear 3 through a speed-up gear train 4. A governor 6 of the well known construction is associated with speed-up gear train 4 to regulate the returning speed of the dial 1. The impulse transmitting mechanism 5 comprises an operating member 8 which is loosely mounted on an eccentric cam (not shown) on shaft 7 so as to be oscillated as the shaft 7 is rotated and a pair of contacts 9 cooperating with operating member 8 such that the contacts produce an impulse when dial 1 returns to the normal position under the control of governor 6. When dial 1 is rotated by the user, operating member 8 is moved in the counterclockwise direction as viewed in FIG. 1 to be prevented from cooperating with contacts 9, whereas when the dial is released to return, operating member 8 is moved in the clockwise direction as viewed in FIG. 1 to engage contacts 9 to operate the same for generating an impulse under the control of the eccentric cam at each definite angle of rotation of the returning dial 1.

According to this invention, an intermediate gear 11 is mounted on the main shaft 2, which is biased to rotate in the returning direction of dial 1, that is in the clockwise direction as viewed in FIG. 1 by means of a spring 10. Intermediate gear 11 meshes with a follower gear 14 mounted on a shaft 13 journalled by a bracket 12 in parallel with main shaft 2. A pawl 16 is pivotally mounted on a pin 15 secured to main gear 3 to selectively engage a pin 17 on the surface of the intermediate gear 11. Pawl 16 is normally biased to disengage from pin 17 by means of a biasing spring 18 connected between pawl 16 and main gear 3. A pin 19 is secured on the surface of main gear 3 to limit the pivotal movement of pawl 16 when it disengages from pin 17. A guide plate **19*a* of resilient material is provided at the limit of movement in the clockwise direction as viewed from the rear side to cooperate with a cam shaped projection 16*a* of pawl 16. Thus, the guide plate 19*a* forces the pawl 16 to engage pin 17** at said limit of movement.

To the follower gear 14 on shaft 13 is secured a rotary disc 20 lying in the same plane as operating member 8, a plurality of radial projections 21 having a height to interfere with the movement of the operating member 8 are formed on the periphery of rotary disc 20. In other words, the angular positions of these projections 21 are determined in accordance with the prescribed first digits (in this example, 1, 5 and 0) at which the transmission of the dial impulse should be prevented. When a projection 21 is positioned close to the left hand side of operating member 8 as viewed in FIG. 1, the return motion of the operating member 8 is prevented, thus locking the impulse transmitting mechanism 5 in the locked state. A ratchet wheel 22 integral with rotary disc 20 is secured to follower gear 14 to cooperate with a pawl 23 which is operated when a hand-set is hooked-off. Pawl 23 pivotally mounted on an intermediate point of bracket 24 is biased to engage ratchet wheel 22 by means of a spring 26 wound upon its pivot pin so that when a hook button 27 is released by the hand-set, the pawl 23 can engage ratchet wheel 22. Before dialing, that is while the hand-set is hooked-on, hook button 27 is depressed and various elements of the telephone dial assume the positions shown in FIG. 1. When the hand-set is hooked-off pawl 23 is rotated to the solid line position shown in FIG. 5 to engage ratchet wheel 22 by the force of spring 26. When the dial is rotated in the counterclockwise direction as viewed in FIG. 1, the movement of main shaft 2, and hence of gear 3 is transmitted to impulse transmitting mechanism 5 via gear train 4 and directly to governor 6. The movement of gear 3 is also transmitted to intermediate gear 11 through pawl 16 and pin 17 engaging therewith. While dial 1 is rotated by the finger of the operator, energy is stored in a returning spring and the shaft 7 of impulse transmitting mechanism 5 is rotated in the counterclockwise direction as viewed in FIG. 1 by an angle corresponding to a digit being dialed, thereby bringing operating member 8 mounted on shaft 7 to the limit of rotation in the counterclockwise direction as viewed in FIG. 1. At this time, the intermediate gear 11 is rotated in the counterclockwise direction as viewed in FIG. 1 by pawl 16 engaging the lower side of pin 17 (see FIG. 3) against the force of spring 10 to rotate follower gear 14 about its shaft 13 in the clockwise direction. Rotation of follower gear 14 is prevented by the cooperation of ratchet wheel 22 and pawl 23.

Thereafter, as the dial is released, its shaft 2 will be rotated in the clockwise direction by the stored energy. When the first digit dialed is not the first digit of trunk exchange, any one of the projections 21 is not in the range of movement of the operating member 8 since these projections are returned to the original position shown in FIG. 1 as shaft 2 is rotated in the opposite direction in a manner described above. Consequently, by the rotation of shaft 7, operating member 8 is vibrated in the longitudinal direction as viewed in FIG. 1 to intermittently make and break contacts 9 to generate a dial impulse. Thereafter the user dials succeeding digits of the called partly. During this operation since pin 17 is maintained in the position shown in FIG. 4, the free end of pawl 16 is maintained out of engagement with pin 17 by the action of spring 18 so that the intermediate gear 11, and hence rotary disc 20 will not be rotated, thus permitting the transmission of dial impulses as in the conventional telephone dial.

Figures 3, 4, 5:
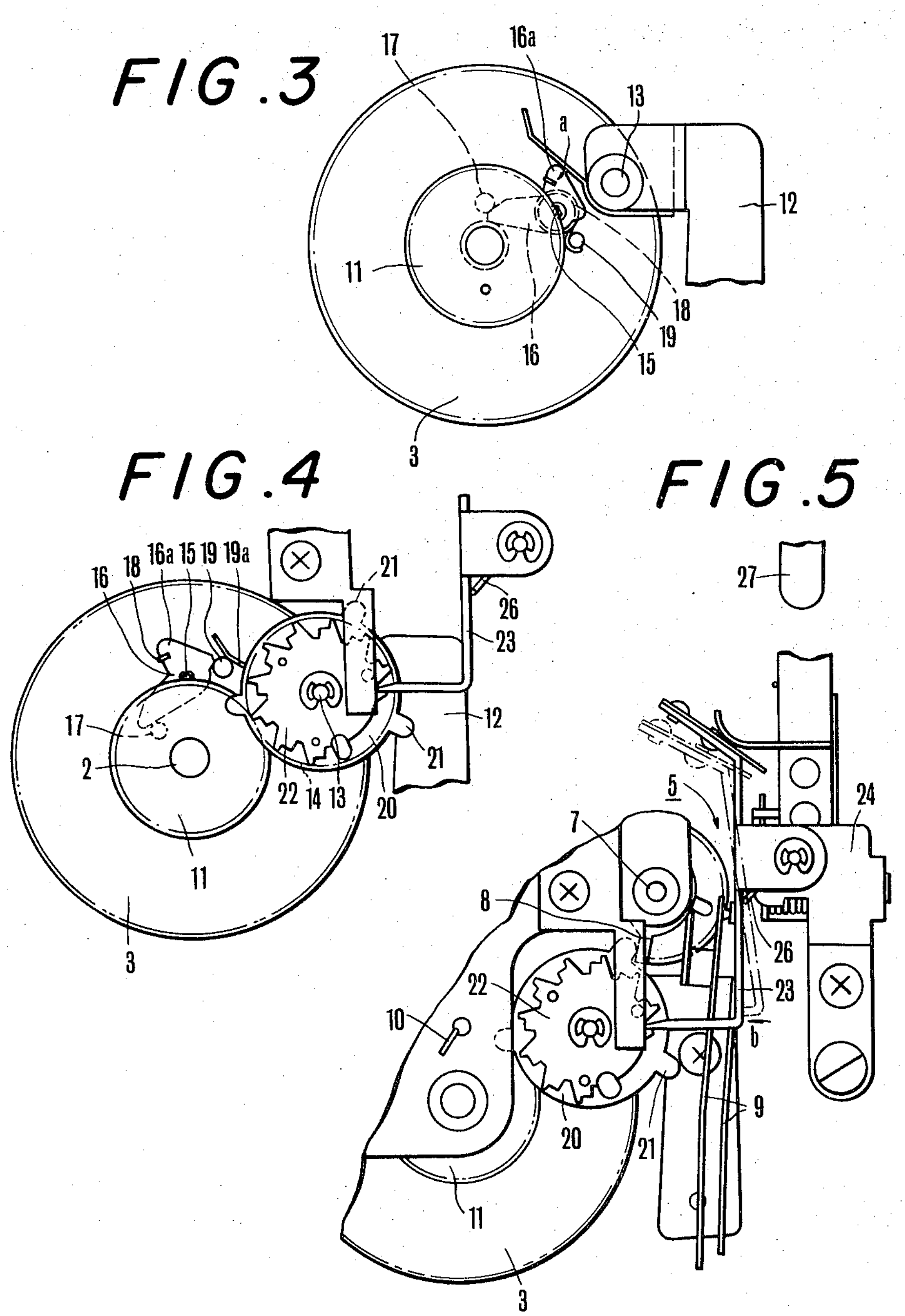
FIGS. 3 and 4 are partial views showing a driving member and elements associated therewith at different positions.
FIG. 5 is an enlarged view of a portion of the dial shown in FIG. 1.

On the other hand, if the first digit dialed corresponds to any one of the prescribed digits 1, 5 and 0, one of the projections 21 of rotary disc 20 will be positioned close to the operating member 8 in the path of the returning movement thereof as shown in FIG. 5. For this reason, when released, the dial is prevented from returning by the engagement of operating member 8 and projection 21 whereby contacts 9 are not operated. Of course, this preventive action of projections 21 continues until the hand-set is hooked-on. Upon hooking-on, hook button 27 is depressed causing pawl 23 to disengage from ratchet wheel 22 whereupon intermediate gear 11 and follower gear 14 are returned to the original position by the force of spring 10.

As above described, by preselecting the number and position of the projections 21 transmission of the dial impulses of the prescribed first digits is positively prevented whereas dial signals of the first digits other than the prescribed first digits can be transmitted, so that unauthorized use of the telephone set can be prevented.

While the invention has been shown and discribed in terms of a preferred embodiment it should be understood that many changes and modifications are possible without departing from the true spirit and scope of the invention as defined in the appended claims.

What is claimed is:

1. A telephone dial, comprising a dial mounted on a rotatable shaft, an intermediate gear mounted on said shaft to be rotatable only in a given direction, a pin mounted on said intermediate gear, means to bias said intermediate gear to rotate in said given direction, a pawl associated with said shaft and arranged such that the pawl can engage said pin only when the dial is in the inoperative position so as to drive said intermediate gear against said bias means when said dial is first rotated, a rotary disc associated for rotation with said intermediate gear, impulse transmitting means, and an operating member driven by said shaft for operating said impulse transmitting means, said disc having a predetermined number of projections adapted when rotated to predetermined position to selectively prevent the return motion of said operating member, means responsive to the hook-off of the associated hand-set to prevent the return motion of said rotary disc, said projections corresponding to predetermined first digits of the called numbers, the call thereof being precluded, whereby when said predetermined first digits are dialed, said impulse transmitting means is rendered inoperative.

2. The telephone dial according to claim 1 wherein said pulse transmitting means comprises a pair of cooperating contacts, said operating member is vibrated to operate said contacts by a shaft connected to said first mentioned shaft through a speed-up gear train, and wherein said rotary disc is provided with a ratchet wheel arranged to cooperate with a pawl operated by a hook button of a telephone set.

* * * * *